March 2, 1971 G. O. HALL ET AL 3,567,279
VEHICLE SEAT
Filed July 9, 1969 2 Sheets-Sheet 1
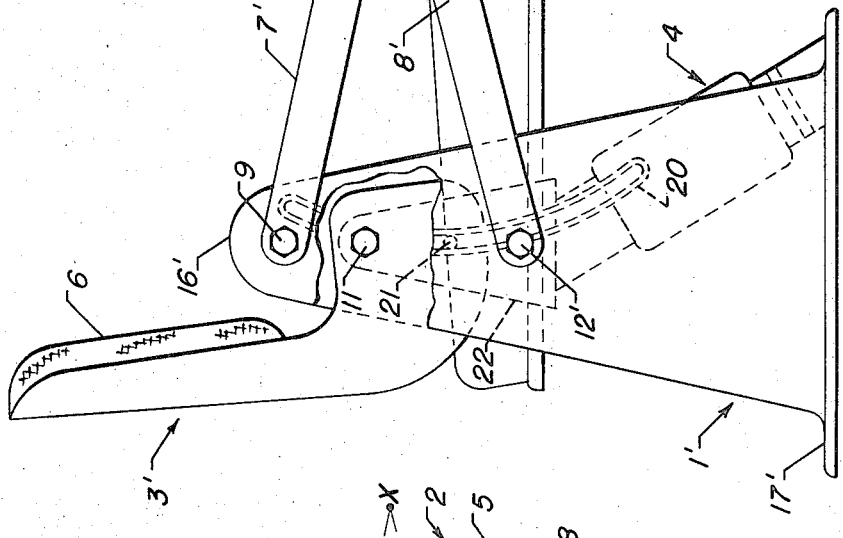
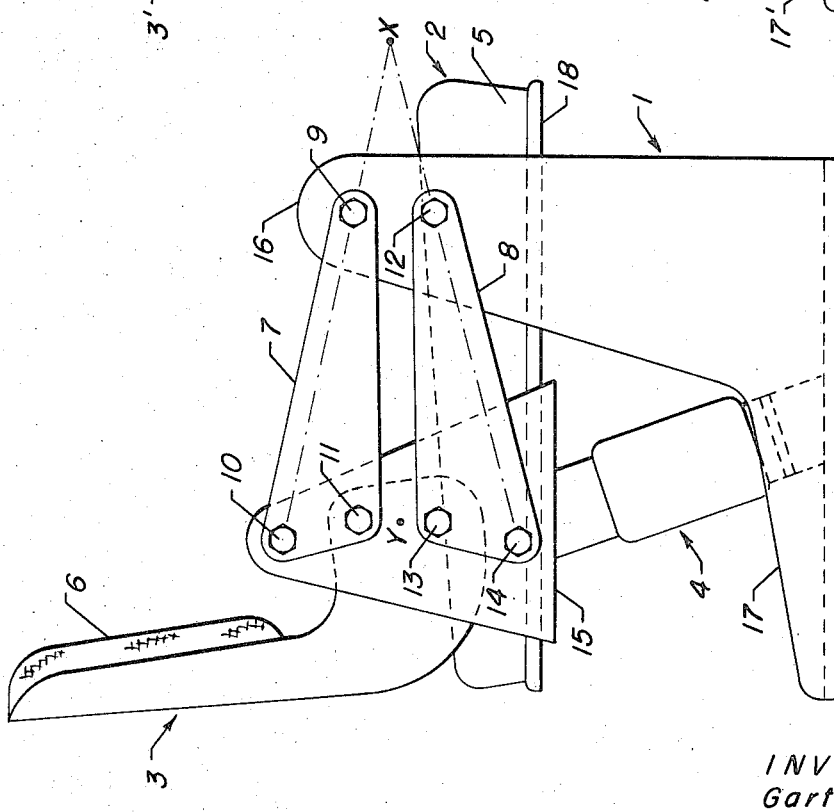
INVENTORS:
Garth O. Hall
Arthur O. Radke
BY: James R. Hoolson, Jr.
Philip T. Liggett
ATTORNEYS March 2, 1971  G. O. HALL ET AL  3,567,279
VEHICLE SEAT
Filed July 9, 1969  2 Sheets-Sheet 2
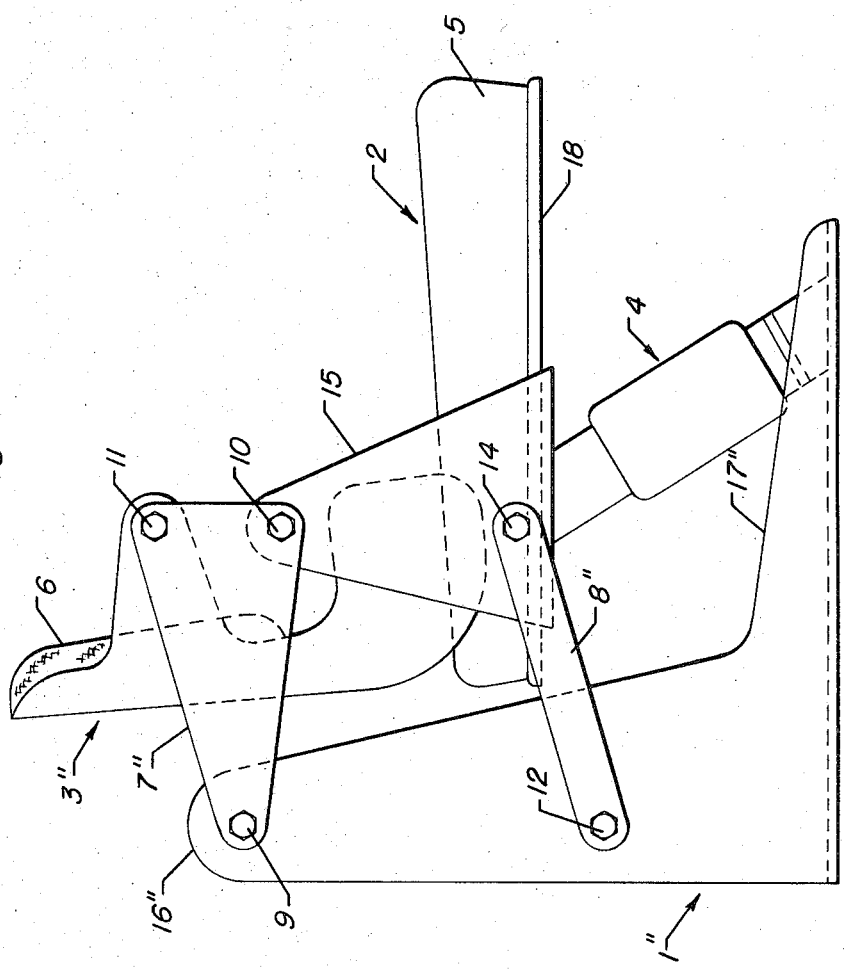
INVENTORS:
Garth O. Hall
Arthur O. Radke.
BY: James R. Hoatson, Jr.
Philip T. Liggett
ATTORNEYS 3,567,279
VEHICLE SEAT
Garth O. Hall, New Berlin, and Arthur O. Radke, Milwaukee, Wis., assignors to Universal Oil Products Company, Des Plaines, Ill.
Filed July 9, 1969, Ser. No. 840,379
Int. Cl. A47c 3/00
U.S. Cl. 297—309                        11 Claims

ABSTRACT OF THE DISCLOSURE

A seat comprising a base part having a vertically extending portion and a seat part biased apart and connected by upper and lower links on each side. All of the links are pivotally connected to the base part and to the seat part. The upper links slope upward to the rear and the lower links slope downward to the rear, whereby linear extensions of said upper and lower links would converge and intersect generally in the area of the knee of an occupant of the seat. On each side of the seat the vertical component of distance between the rear ends of the upper and lower links is greater than the vertical component of distance between the front ends of the upper and lower links. The seat part may be located forward, even with, or rearward of the vertically extending portion of the base part in different embodiments. In each instance, a back part is preferably connected to the seat part in such a manner that the back part maintains a constant angle of reclination.

---

This invention relates to a seat comprising a base part having a vertically extending portion and a seat part biased apart and connected by upper and lower links on each side. All of the links are pivotally connected to the base part and to the seat part. The upper links slope upward to the rear and the lower links slope downward to the rear, whereby linear extensions of said upper and lower links would converge and intersect generally in the area of the knee of an occupant of the seat. On each side of the seat the vertical component of distance between the rear ends of the upper and lower links is greater than the vertical component of distance between the front ends of the upper and lower links. The links, as heretofore discussed have been considered as those portions of structural members used to connect the base part and the seat part. These structural members may be expanded, however, to include points of attachment for a seat back. The seat part may be located forward, even with, or rearward of the vertically extending portion of the back part in different embodiments. In each instance, base part is preferably connected to the seat part in such a manner that the back part maintains a constant angle of reclination.

BACKGROUND OF INVENTION

In the vehicle seating industry there are currently a variety of motion guidance and suspension means in use. The different forms of conventional guide and suspension systems include a seat on rollers which rides in a mating track, or alternatively, stationary rollers with a track mounted upon the seat. Using either embodiment, this means of suspension requires an expensive and space consuming roller and track system. While the track may be curved to effectuate rotation of the seat about the knee point of the seat occupant, the present invention approximates this motion with a guidance and suspension system requiring far less space and weight.

Another form of motion governing means which is currently in use is a parallelogram linkage. A seat using this type of linkage is limited to applications where the total motion is small. When large oscillatory motions are encountered, the front edge of the seat tends to lift the legs of a seat occupant during one portion of the cycle, and the operator's ankles are bent at an acute angle during the reverse portion of the cycle. Both of these motions become fatiguing after repeate occurrence.

Still another type of seat guidance currently used is a scissors suspension. This system utilizes two crossed members on each side of the seat. The opposite ends of each member fasten the seat to the base. The scissors suspension requires a rather elaborate fastening means on at least one end of each of the crossed members in order for the seat to move relative to the base. In the operation of the linkage, the seat moves downward or upward when subjected to increasing or decreasing loads so that the angle formed at the intersection of the two members increases and decreases accordingly. At least one end of each of the members must terminate in a fastening means which forms a yieldable connection so that the two members are not locked at a fixed angle with respect to each other. This yieldable connection is often in the form of a roller connected to an end of each of the crossed members. The roller rides in a track which is a part of the seat part or base part, and is biased in a direction which will raise the seat with respect to the base. The yieldable connection, whatever the form, adds substantially to the expense of the seat. Another disadvantage of the scissors suspension is that by its nature the scissors requires a substantial clearance between the base part and the seat part of a seat assembly. This results in an increase in the space required between the bottom of the seat part and the floor of the vehicle. This clearance space is usually an acute problem with seats used in trucks, tractors, and other heavy vehicles.

OBJECTS

It is an object of the present invention to provide a solution to the aforementioned problems of space and expense requirements while maintaining the lower legs of a seated occupant in a static position. Another object of this invention is to provide a seat in which the motion of the seat during increases and decreases of load closely approximates a rotation of the seat at a constant angular velocity throughout about the knee point of the seat occupant. While not conforming exactly to this ideal motion, the seat of this invention does provide a reasonable approximation thereof while retaining a very simple design. Another object is to provide a vehicle seat which does not require the use of an expensive track and roller system in the guidance of the motion of the seat part relative to the base part.

Still another object of this invention is to eliminate the need for seat suspension linkage beneath the seat, that is, between the seat and the vehicle floor upon which the seat is mounted. This feature reduces the clearance required between the bottom of the seat part and the floor of the vehicle to the minimum within which a spring biasing means can operate.

A further object of the invention is to provide a seat having the foresaid motion characteristics, in which the seat back maintains substantially the same degree of reclination with respect to the vertical throughout the cycle of oscillation, despite the pivotal motion of the seat. The manner of attaining this feature depends upon the particular embodiment of this invention. Common to all embodiments is a pivotal mounting of the back part onto the seat part and onto the upper and lower linking members or directly onto the base part in such a manner as to cause the back part to move in translational motion only with respect to the base part. This results in the seat back maintaining a constant degree of reclination. This fixed disposition of the seat back prevents any backward or forward pivoting of the upper torso of the seat occupant as the seat moves from its normal position. This feature is also important from a design standpoint in that the relative motion between the seat back and the seat part approximates a relative rotation about an axis which coincides with an imaginary straight line extending through both hips of a seat occupant.

DESCRIPTION

In a broad aspect this invention is a seat comprising: a base part having a vertically extending portion and a lower portion; a seat part positioned generally above the lower portion of said base part; a spring means biasing said seat part generally upward with respect to the lower portion of said base part; an upper link on each side of said seat, each upper link being inclined upward to the rear and having first and second ends and being pivotally attached at said first end at a pivot point to the vertically extending portion of said base part and attached at said second end at a support point to the aforesaid seat part; and a lower link on each side of said seat, each lower link being inclined downward to the rear and having first and second ends and being pivotally attached at said first end at a pivot point to the vertically extending portion of said base part and attached at said second end at a support point to the aforesaid seat part, whereby linear extensions along said upper and lower links would converge generally in the area of the knee of an occupant of the seat. For most oscillations encountered in wheeled or tracked vehicle travel, one good approximation of pivoting of a seat about the knees is attained when the pivot points of the upper and lower links on each side of the seat are in substantially vertical alignment, and the support points of the upper and lower links on each side of the seat are in substantial vertical alignment.

In the preferred form of this seat, the first ends are the front ends of the upper and lower links, and the second ends are the rear ends of the upper and lower links. The seat part is thereby located generally to the rear of the vertically extending portion of the base part. Ideally the pivot points would be located at the knee point of the seat occupant as viewed from the side of the seat. Since this would be a very cumbersome arrangement entailing considerable effort and discomfort to a person entering and leaving the seat, and since the vertically extending portion of the base part would impede operation of the vehicle, the pivot points are positioned near the front edge of the aforesaid seat part, the front edge of the seat part being slightly rearward from the knee point of the seat occupant.

A further refinement of the preferred form of this seat exists where a seat back is pivotally attached to the upper and lower links at substantially vertically aligned back swivel points located within the vertical distance between the support points and forward from the support points and separated by a distance equal to the distance between the aforesaid pivot points whereby the back swivel points and the pivot points form a parallelogram. This results in the seat back moving with translational or linear motion only, and without angular rotation. The back swivel points are so located that the relative rotation of the seat part with respect to the back part is about an imaginary line extending through both hips of the seat occupant.

In alternative embodiments of this seat, the first ends are the rear ends of the upper and lower links, and the second ends are the front ends of the upper and lower links. That is, the pivot points are to the rear of the support points which means that the vertically extending portion of the base part is to the rear of the points at which the links are connected to the seat part. When the support points are located near the front edge of the seat part, the seat part is generally even with the vertically extending portion of the base part. In a refinement of this embodiment a track is fixed onto the base part, a seat back part having a guide follower mounted thereon is pivotally attached on each side of the seat to the seat part at a seat back swivel located above the guide followers, and the guide follower is engaged in the track, whereby the seat back undergoes only translational motion and the seat part effects angular rotation with respect to the seat back part approximately about the hips of a seat occupant as the seat part oscillates. A similar and alternative refinement exists where a guide follower means is fixed onto the base part. A seat back part having a track mounted thereon is pivotally attached on each side of the seat to the seat part at a seat back swivel located above the guide follower, and the guide follower is engaged in the track, whereby the seat back undergoes only translational motion and the seat part effects angular rotation with respect to the seat back part approximately about the hips of a seat occupant as the seat part oscillates. In both of these refinements, the relative motion between the track and the guide follower means must be merely a translational displacement of the path followed by the seat back swivel as the seat oscillates. Since the motion of the seat approximates a rotation about the knees of a seat occupant, the path followed by the seat back swivel approximates an arc with the distance between the back swivel and the knees of the seat occupant as a radius. The track, whether it is on the base part or the seat back part, will be a duplicate of this aforesaid arc.

In the other embodiment of this seat where the first ends are the rear ends of the upper and lower links, and the second ends are the front ends of the upper and lower links, the support points are located near the rear edge of the seat part. In this configuration, the seat part is forward of the vertically extending portion of the base part. In a refinement of this embodiment, the seat back part is pivotally attached to the lower links at the support points on the lower links and to the upper links at back swivel points substantially vertically aligned with the support points and separated from the support points on the lower links by a distance equal to the distance between the pivot points, whereby the back swivel points and the pivot points form a parallelogram. In this embodiment, as with the others, the seat back motion is entirely translational.

The seat of this invention is designed primarily for use in a heavy vehicle, such as a truck. As a truck travels along a road, vibrations and other shocks are transmitted through the floor of the vehicle to the base part of a seat. In order to isolate the occupant or operator of the vehicle from these shocks and vibrations, the seat is allowed to oscillate with respect to the base part in response thereto. To reduce fatigue and danger to the seat occupant it is important to control the relative motion of the seat part as it oscillates with respect to the base part. The seat in its oscillatory movement, actually undergoes both rotational and translational motion with respect to the base part. In analyzing the rotational motion from the side of the seat part, it can be seen that the upper portion of the seat part rotates about the pivot point formed where the upper link is joined to the base part, while the lower portion of the seat part rotates about the pivot point formed where the lower link is joined to the base part. The upper and lower links are normally equal in length in order to achieve the most desirable motion. Where the upper and lower links differ in length, the seat can still approximate a rotation about the knees of the seat occupant, but over a smaller amplitude of oscillation than would have been possible were the upper and lower links of equal length.

In the preferred embodiment of this seat, the front ends of the links terminate near the front edge of the seat part and the forward points, either the pivot points or the support points, are spaced closely together so as to be an optimum distance apart, whereby the seat part closely approximates rotation about the knee point of the seat occupant as the seat part oscillates with respect to the vehicle. The pivot points cannot be made to coincide, however, because the seat rotation would then be about a single pivot point rather than about the knee point, and oscillation of the seat part would cause an unacceptably large degree of angular rotation. In the preferred embodiment, the optimum distance between pivot points for most seat occupants is about 4½ inches where the pivot points are located about 10 inches behind the knee point of the operator and the support points are located about 12 inches to the rear of the pivot points at approximately the hips of the operator, and the support points are spaced about 10 inches apart. This spacing results in the rotation of the operator's body approximately about his knee so that the operator's lower legs remain substantially stationary, thus, reducing fatigue and increasing safety of the operator of the vehicle. Extensions of the lines joining the support points and pivot points on the upper and lower links respectively converge from the rear of the seat towards the front of the seat, eventually intersecting at approximately the knee point of the vehicle operator.

The pivots used in this invention may be pins extending from the links into receptacles in the base part or the seat part, pins extending from the base part or the seat part into receptacles in the links, or independent pins which extend into receptacles in the links, the base part, and the seat part.

Any conventional spring biasing means may be used to bias the seat part away from the base part. The spring biasing means may take the form of an air cushion, a compression spring, a leaf spring, a coil spring, or any other conventional spring biasing means. While this spring biasing means is normally located beneath the seat between the seat part and the base part, an acceptable alternative is a spring biasing means mounted on both sides of the seat and biasing the seat part upward away from the vehicle floor. The spring biasing means in this case is usually a coil spring attached to either the vehicle frame or the vertically extending portion of the base part.

The various features of this invention are more clearly illustrated in the attached drawing in which:

FIG. 1 is an elevational view of the preferred embodiment of this invention.

FIG. 2 is an elevational view of an alternative embodiment of this invention.

FIG. 3 is an elevational view of another alternative embodiment of this invention.

Referring now to FIG. 1, there is shown a vehicle seat comprising a base part 1 having a vertically extending portion 16 and a lower portion 17 which is attached to the vehicle floor. Mounted upon base part 1 is a seat part 2, having a seat cushion 5 and side frames 15 attached to the seat pan 18 on both sides of cushion 5. Seat part 2 is positioned generally above the lower portion 17 of base part 1 and is biased away from base part 1 by air cushion 4. The upper end of air cushion 4 is bolted to seat pan 18 and the lower end of air cushion 4 is bolted to the lower portion 17 of base part 1. Seat part 2 is joined to base part 1 by an upper link 7 and a lower link 8 on each side of the seat. Upper link 7 is pivotally attached at a first end, which is its forward end at a pivot point on the upper portion 16 of base part 1 by a fastening means 9. Fastening means 9 is a bolt assembly comprising a hexagonal headed bolt having a shank which is unthreaded adjacent to the bolt head, and a nut attached to the threaded end of the bolt shank. The unthreaded portion of the bolt shank allows the upper link 7 to rotate freely about the bolt shank. The second or rear end of link 7 is similarly attached to the side frame 15, of seat part 2, by bolt assembly 10. Lower link 8 is pivotally attached at a first end, which is its forward end at a pivot point on the upper portion 16 of base part 1 by bolt assembly 12. Similarly, the link 8 is attached at a second or rear end to side frame 15 by a bolt assembly 14. As can be seen from the diagram, bolt assembly 12 is vertically aligned with assembly 9, thereby causing the pivot points to be in vertial alignment. Also, the distance between bolt assemblies 9 and 12 is less than the distance between the bolt assemblies 10 and 14. As depicted, bolt assemblies 10 and 14 are more than twice as far apart as are bolt assemblies 9 and 12. It can be seen that linear extensions connecting the support point and pivot point along the upper and lower links converge generally in the area of the knee of an occupant of the seat. This area is labeled as X and approximates the axis of rotation of the seat part as the seat part undergoes oscillatory motion.

Bolt assembly 11 is used to fasten link 7 at a back swivel point to seat back part 3 and bolt assembly 13 is used to attach link 8 to seat back part 3 at a back swivel point. Bolt assemblies 11 and 13 are substantially vertically aligned and are located within the vertical distance between the support points at bolt assemblies 10 and 14. Both assemblies 11 and 13 are also located forward from bolt assemblies 10 and 14 and are separated by a distance equal to the distance between bolt assemblies 9 and 12 at the pivot points. Bolt assemblies 11, 13, 9 and 12 thereby form a parallelogram linkage which insures that seat back part 3 will always maintain a constant angle or degree of reclination. Bolt assemblies 11 and 13 are similar in design to bolt assembly 9.

It can be seen from FIG. 1 that as seat part 2 moves closer to lower portion 17 of base part 1 during the oscillatory movement of the seat, air spring 4 is compressed and seat part 2 moves downward and rotates slightly in a counterclockwise direction. This downward movement and slight counterclockwise motion of seat part 2 approximates a rotation of seat part 2 about point X which is generally in the area of the knee point of the occupant of the seat. Point X is located in front of seat part 2 and slightly above cushion 5. As the seat moves downward, the knees and lower legs of the occupant remain stationary and the upper torso of the occupant remains at a substantially constant angle of reclination with respect to the vertical. This alignment is maintained by cushion 6 which is attached to seat back part 3. Since seat back part 3 undergoes only translational motion, and since seat part 2 undergoes both translational and rotational motion, there is a rotation of seat part 2 with respect to seat back part 3 about an axis Y. Because of the positioning of bolts 11 and 13 with respect to bolts 10 and 14, the relative rotation of seat back part 3 with respect to seat part 2 is about an axis Y which is an imaginary line passing approximately through both hips of the seat occupant. As a result of the motion heretofore described, the lower legs of the seat occupant remain stationary, his thighs flex at the knees and bend at the hips, and his back remains at a constant angle of reclination during the entire oscillatory cycle. This type of motion provides the seat occupant with quite a comfortable ride even though the vehicle may undergo considerable shock and vibration.

One alternative embodiment of the seat of this invention is a seat as illustrated in FIG. 2. The seat of FIG. 2 is made up of the same or similar structural members as that of FIG. 1, and the motion of the seat is the same as that of the seat of FIG. 1, but there are differences in the manner of assembly of the structural members. In FIG. 2, the first ends, or the ends connected to the pivot points, are the rear ends of the upper links 7' and lower links 8', and the second ends, that is the ends connected to the support points, are the front ends of upper links 7' and lower links 8'. The front ends of links 7' and 8' are connected to forward side frames 15' of seat part 2' by bolt assemblies 10 and 14 at the support points of the seat part 2' which are located near the front edge of seat part 2'. The rear ends of links 7' and 8' are connected to pivot points on the vertical extending portion 16' of base part 1' by bolt assemblies 9 and 12'. Linear extensions along the links between the pivot point and the support point on each link converge and intersect generally in the area of the knees of an occupant of the seat. Bolt assemblies 9, 10, and 14 are identical to those used in the seat of FIG. 1, but bolt assembly 12' differs because of the track 20 fixed onto base part 1'. Track 20 is fastened to the inside surface of base part 1', by machine screws (not shown). Track 20 forms a path which approximates an arc with the knees of a seat occupant as the radius. The purpose of track 20 is to accommodate a guide follower nub 21 which protrudes outward from seat back part 3' into track 20. Base part 1' is partially broken away to better show that seat back part 3' is also attached to rear side frames 22 by a bolt assembly 11 at a back swivel point on each side of the seat. Nub 21 and bolt assembly 11 are vertically aligned and are separated by the same distance as are bolt assemblies 14 and 10. Nub 21 and bolt assemblies 11, 10, and 14, thereby form a parallelogram through the oscillations of the seat. Both bolt assembly 11 and nub 21 transverse identical arcs having a radius equal to the distance between the back swivel and the knees of a seat occupant, but the arcs are vertically displaced from each other by a distance equal to the distance between bolt assemblies 10 and 14. Seat back part 3' is thereby held at a constant angle of reclination throughout the oscillatory cycles of the seat. Bolt assembly 12' does not extend entirely through base part 1' because this would interfere with the movement of nub 21. Instead, bolt assembly 12' is securely screwed into base part 1' and lower link 8' pivots about the shank of bolt assembly 12' adjacent to the bolt head.

A further alternative embodiment is as illustrated in FIG. 3. The seat of FIG. 3 is made up of the same or similar structural members as the seats of FIGS. 1 and 2, and the motion of the seat is the same as that of the seats of FIGS. 1 and 2, but there are again differences in the manner of assembly. In FIG. 3, as in FIG. 2, the first ends, or the ends connected to the pivot points, are the rear ends of the upper and lower links, and the second ends, that is, the ends connected to the support points, are the front ends of the upper and lower links. The front ends of links 7" and 8" are connected to the side frames 15 of seat part 2 by bolt assemblies 10 and 14 at the support points of seat part 2 located near the rear edge of seat part 2. The rear ends of links 7" and 8" are connected to pivot points on the vertically extending portion 16" of base part 1" by bolt assemblies 9 and 12. Linear extensions along the links between the pivot point and the support point on each link converge and intersect generally in the area of the knees of an occupant of the seat. Bolt assemblies 9, 10, 12 and 14 are identical to those used in the seat of FIG. 1. A seat back part 3" is pivotally attached on each side to lower link 8" at a support point on lower link 8" by bolt assembly 14. Seat back part 3" is pivotally attached on each side to upper link 8" at a back swivel point by a bolt assembly 11. Bolt assembly 11 is substantially vertically aligned with bolt assembly 14 and is separated from bolt assembly 14 by a distance equal to the distance between bolt assemblies 9 and 12, whereby bolt assemblies 9, 11, 14 and 12 form a parallelogram throughout the oscillations of the seat. Seat back part 3" is thereby held at a constant angle of reclination throughout the oscillatory cycles of the seat.

The foregoing detailed description of several embodiments of this invention has been given for clearness of understanding only and no unnecessary limitations should be construed therefrom as other modifications will be obvious to those skilled in the art.

We claim as our invention:

1. A seat comprising:
   (a) a base part having a vertically extending portion and a lower portion;
   (b) a seat part positioned generally above the lower portion of said base part;
   (c) a spring means biasing said seat part generally upward with respect to the lower portion of said base part;
   (d) an upper link on each side of said seat, each upper link being inclined upward to the rear and having first and second ends and being pivotally attached at said first end at a pivot point to the vertically extending portion of said base part and attached at said second end at a support point to the aforesaid seat part; and
   (e) a lower link on each side of said seat, each lower line being inclined downward to the rear and having first and second ends and being pivotally attached at said first end at a pivot point to the vertically extending portion of said base part and attached at said second end at a support point to the aforesaid seat part, whereby linear extensions along said upper and lower links would converge generally in the area of the knee of an occupant of the seat.

2. The seat of claim 1 further characterized in that said pivot points of said upper and lower links on each side of said seat are in substantial vertical alignment, and said support points of said upper and lower links on each side of said seat are in substantial vertical alignment.

3. The seat of claim 2 further characterized in that said first ends are the front ends of said upper and lower links, and said second ends are the rear ends of said upper and lower links.

4. The seat of claim 3 further characterized in that a seat back part is pivotally attached to said upper and lower links at substantially vertically aligned back swivel points located within the vertical distance between said support points and forward from said support points and separated by a distance equal to the distance between the aforesaid pivot points, whereby said back swivel points and said pivot points form a parallelogram.

5. The seat of claim 3 further characterized in that the aforesaid pivot points are positioned near the front edge of the aforesaid seat part.

6. The seat of claim 2 further characterized in that said first ends are the rear ends of said upper and lower links, and said second ends are the front ends of said upper and lower links.

7. The seat of claim 6 further characterized in that the aforesaid support points are located near the front edge of the aforesaid seat part.

8. The seat of claim 7 further characterized in that a track is fixed onto said base part, a seat back part having a guide follower mounted thereon is pivotally attached on each side of said seat to said seat part at a seat back swivel located above said guide follower, and said guide follower is engaged in said track, whereby said seat back undergoes only translational motion and the seat part effects angular rotation with respect to said seat back part approximately about the hips of a seat occupant as said seat part oscillates.

9. The seat of claim 7 further characterized in that a guide follower means is fixed onto said base part, a seat back part having a track mounted thereon is pivotally attached on each side of said seat to said seat part at a seat back swivel located above said guide follower and said guide follower is engaged in said track, whereby said seat back undergoes only translational motion and said seat part effects angular rotation with respect to said seat back part approximately about the hips of a seat occupant as said seat part oscillates.

10. The seat of claim 6 further characterized in that the aforesaid support points are located near the rear edge of the aforesaid seat part.

11. The seat of claim 10 further characterized in that a seat back part is pivotally attached to said lower links at said support points on said lower links and to said upper links at back swivel points substantially vertically aligned with said support points and separated from said support points on said lower links by a distance equal to the distance between the aforesaid pivot points, whereby said back swivel points and said pivot points form a parallelogram.

References Cited

UNITED STATES PATENTS

| | | | |
|---|---|---|---|
| 3,198,473 | 8/1965 | Holz | 248—399 |
| 3,356,413 | 12/1967 | Radke et al. | 297—300 |
| 3,423,060 | 1/1969 | Fulling et al. | 248—399 |
| 3,504,881 | 4/1970 | Pillons et al. | 248—399 |

JAMES T. McCALL, Primary Examiner

U.S. Cl. X.R.

297—347